United States Patent
Takamatsu

(10) Patent No.: US 8,920,547 B2
(45) Date of Patent: Dec. 30, 2014

(54) ADSORBENT CANISTERS

(75) Inventor: Hiroshi Takamatsu, Chiryu (JP)

(73) Assignee: Aisan Kogyo Kabushiki Kaisha, Obu-Shi, Aichi-Ken (JP)

( * ) Notice: Subject to any disclaimer, the term of this patent is extended or adjusted under 35 U.S.C. 154(b) by 58 days.

(21) Appl. No.: 13/110,131

(22) Filed: May 18, 2011

(65) Prior Publication Data

US 2011/0290117 A1    Dec. 1, 2011

(30) Foreign Application Priority Data

May 25, 2010  (JP) .................. 2010-119212

(51) Int. Cl.
- *B01D 53/02* (2006.01)
- *F02M 33/02* (2006.01)
- *B01D 53/04* (2006.01)
- *F02M 39/00* (2006.01)

(52) U.S. Cl.
CPC ...... *B01D 53/0407* (2013.01); *B01D 2257/702* (2013.01); *B01D 2259/40086* (2013.01); *B01D 2259/657* (2013.01); *B01D 2259/402* (2013.01); *B01D 2253/102* (2013.01); *B01D 2259/4516* (2013.01); *F02M 39/00* (2013.01)
USPC .................. 96/131; 123/519; 96/139; 96/141; 96/144; 96/152

(58) Field of Classification Search
CPC ....... F02M 39/00; F02M 33/00; B01D 45/00; B01D 53/00
USPC .............................. 96/108–154; 123/434–593
See application file for complete search history.

(56) References Cited

U.S. PATENT DOCUMENTS

| | | | | |
|---|---|---|---|---|
| 5,743,943 | A * | 4/1998 | Maeda et al. ................... | 96/126 |
| 6,514,326 | B1 * | 2/2003 | Hara et al. ...................... | 96/133 |
| 7,214,258 | B2 * | 5/2007 | Abidi et al. ..................... | 96/131 |
| 2009/0320806 | A1 * | 12/2009 | Lang et al. ..................... | 123/519 |

FOREIGN PATENT DOCUMENTS

| | | |
|---|---|---|
| JP | 09 021361 | 1/1997 |
| JP | 2005 023835 | 1/2005 |

* cited by examiner

*Primary Examiner* — Duane Smith
*Assistant Examiner* — Joubert X Glover
(74) *Attorney, Agent, or Firm* — Ladas & Parry LLP

(57) ABSTRACT

An adsorbent canister includes a casing defining a first adsorption chamber, a second adsorption chamber and a diffusion chamber therein, and an adsorbent capable of adsorbing the fuel vapor and filled in the first adsorption chamber and the second adsorption chamber. The first adsorption chamber and the second adsorption chamber communicate with each other via the diffusion chamber. The casing has on a side wall thereof a fuel introducing port configured to introduce fuel vapor into the first adsorption chamber and an air communicating port configured to introduce air into the second adsorption chamber. The diffusion chamber has at least one of a first diffusion chamber and a second diffusion chamber. The first diffusion chamber is positioned above the first adsorption chamber and extends over the entire length of the first adsorption chamber. The second diffusion chamber is positioned below the second adsorption chamber and extends over the entire length of the second adsorption chamber.

5 Claims, 3 Drawing Sheets

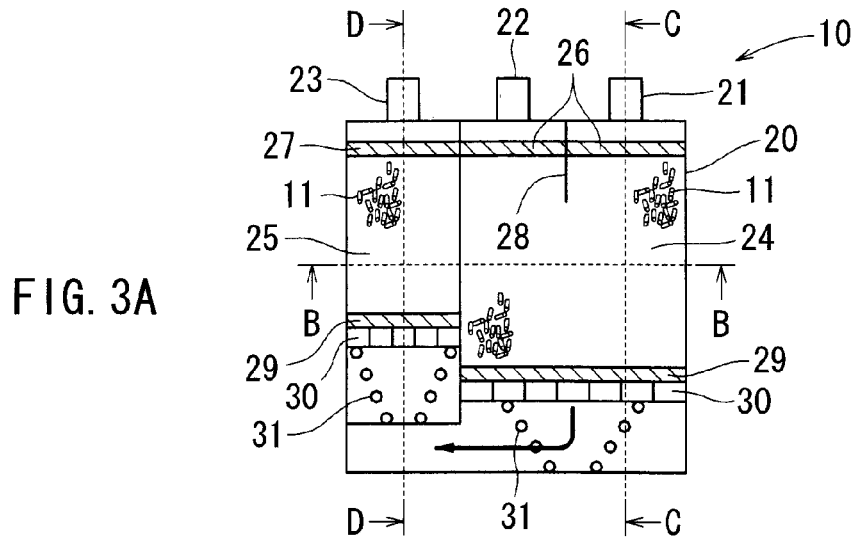
FIG. 3A
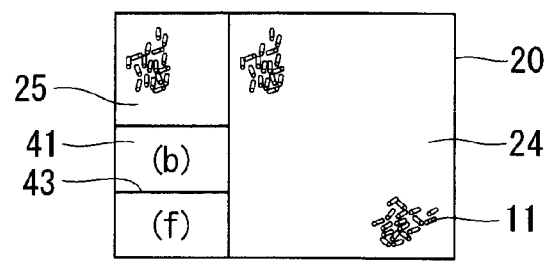
FIG. 3B
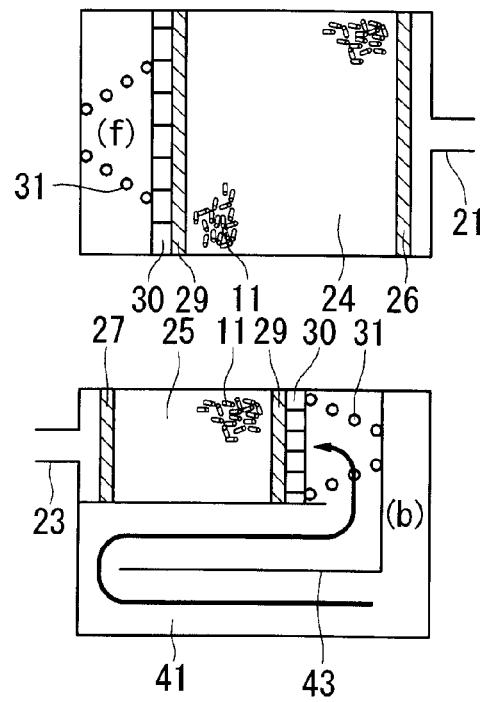
FIG. 3C
FIG. 3D

ADSORBENT CANISTERS

CROSS-REFERENCES TO RELATED APPLICATIONS

This application claims priority to Japanese patent application serial number 2010-119212, the contents of which are incorporated herein by reference.

BACKGROUND OF THE INVENTION

1. Field of the Invention

The present invention relates to adsorbent canisters for temporarily trapping fuel vapor (e.g., gasoline vapor) vaporized in a fuel tank.

2. Description of the Related Art

Gas vehicle such as automobile is equipped with an adsorbent canister as a part of a fuel vapor processing system for processing fuel vapor vaporized in a fuel tank. The adsorbent canister has a hollow casing and an adsorbent filled in the casing. The casing has a fuel introducing port for introducing the fuel vapor from the fuel tank into the casing, and an air communicating port for introducing ambient air into the casing. The adsorbent is composed of activated carbon or the like and can adsorb and desorb the fuel vapor. That is, the fuel vapor flows into the adsorbent canister and adsorbs onto the adsorbent, e.g., during parking, and desorbs from the adsorbent due to purge operation while the engine is running.

Because a part of the fuel vapor adsorbing onto the adsorbent desorbs from the adsorbent and diffuses in the casing with time, there is a risk that the fuel vapor flows out of the adsorbent canister through the air communicating port. Accordingly, some conventional adsorbent canisters have a casing provided with a partition configured to divide an inner space of the casing into a first adsorption chamber closed to the fuel introducing port and a second adsorption chamber closed to the air communicating port. The fuel vapor flowing into the casing via the fuel introducing port is trapped in the first adsorption chamber, and a part of the fuel vapor diffusively flowing out of the first adsorption chamber is trapped in the second adsorption chamber.

Japanese Laid-Open Patent Publication No. H09-21361 discloses an adsorbent canister having a communicating chamber connected to the first adsorption chamber and the second adsorption chamber and having partition walls therein. The partition walls define a meandering path in the communicating chamber such that the length of a pathway between the first adsorption chamber and the second adsorption chamber is increased. This configuration may require a longer period of time for the fuel vapor to reach the second adsorption chamber from the first adsorption chamber, so that the adsorbent canister can decrease the amount of the fuel vapor diffusively flowing into the second adsorption chamber from the first adsorption chamber in a certain period of time. Consequently, it is able to reduce the amount of the fuel vapor diffusively flowing into the atmosphere during parking.

Japanese Laid-Open Patent Publication No. 2005-23835 discloses an adsorbent canister equipped with a cartridge having a labyrinth structure. The labyrinth structure requires a longer period of time for the fuel vapor to pass through the cartridge, so that it is able to reduce the amount of the fuel vapor passing through the cartridge in a certain period of time. Consequently, it is able to reduce the amount of the fuel vapor flowing into the atmosphere during parking.

In these adsorbent canisters, the pathway between the first adsorption chamber and the second adsorption chamber is lengthened, however the total volume of the pathway is not increased. Therefore, there has been a need in the art for an improved adsorbent canister.

SUMMARY OF THE INVENTION

One aspect according to an adsorbent canister of this disclosure includes a casing defining a first adsorption chamber, a second adsorption chamber and a diffusion chamber therein, and an adsorbent capable of adsorbing the fuel vapor and filled in the first adsorption chamber and the second adsorption chamber. The first adsorption chamber and the second adsorption chamber communicate with each other via the diffusion chamber. The casing has on a side wall thereof a fuel introducing port configured to introduce fuel vapor into the first adsorption chamber and an air communicating port configured to introduce air into the second adsorption chamber. The diffusion chamber has at least one of a first diffusion chamber and a second diffusion chamber. The first diffusion chamber is positioned above the first adsorption chamber and extends over the entire length of the first adsorption chamber. The second diffusion chamber is positioned below the second adsorption chamber and extends over the entire length of the second adsorption chamber.

In accordance with this aspect, because the casing defines at least one of the first diffusion chamber positioned above the first adsorption chamber and the second diffusion chamber positioned below the second adsorption chamber, it is able to increase the volume of the diffusion chamber, i.e., a pathway between the first adsorption chamber and the second adsorption chamber. In addition, while the fuel vapor diffusively moves from the first adsorption chamber to the second adsorption chamber through the diffusion chamber, the fuel vapor should move upwardly against its own weight. Accordingly, the adsorbent canister requires a longer period of time for the fuel vapor to diffusively move through the diffusion chamber, so that it is able to reduce the amount of the fuel vapor moving from the first adsorption chamber to the second adsorption chamber for a certain period of time. Consequently, it is able to reduce the amount of the fuel vapor flowing into the atmosphere during parking.

BRIEF DESCRIPTION OF THE DRAWINGS

In the accompanying drawings:

FIG. 3A is a schematic horizontal cross sectional view of a third embodiment of the adsorbent canister; and FIGS. 3B-D are schematic cross sectional views taken along with B-B, C-C and D-D lines in FIG. 3A, respectively.

DETAILED DESCRIPTION OF THE PREFERRED EMBODIMENTS

Figure 1A:
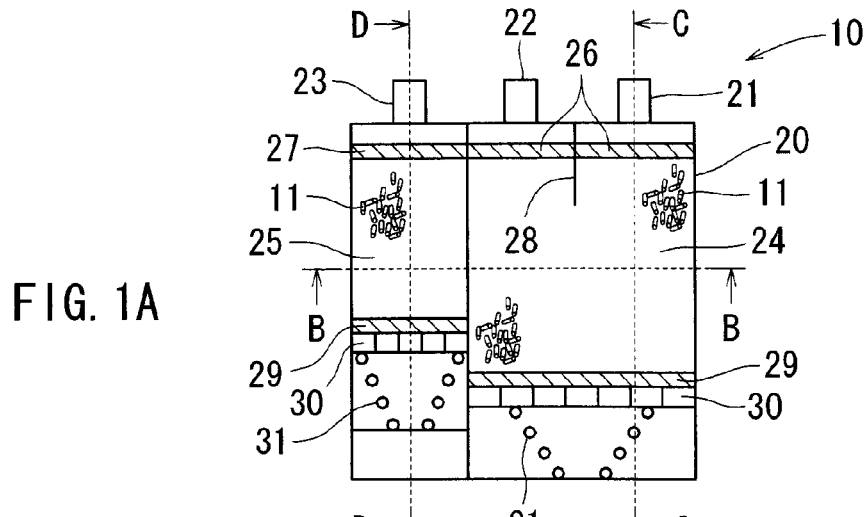
FIG. 1A is a schematic horizontal cross sectional view of a first embodiment of an adsorbent canister.

Each of the additional features and teachings disclosed above and below may be utilized separately or in conjunction with other features and teachings to provide improved adsorbent canisters. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

A first embodiment of this teaching will be described with reference to the accompany drawings. Each of arrows in the drawings shows a flow direction of fuel vapor during parking. In addition, a symbol (f) means that the fuel vapor flows along a direction vertical to the drawing from the near side across the drawing, on the other hand, a symbol (b) means that the fuel vapor flows along another direction opposite to the direction shown by the symbol (f). When there is not specific definition, directions "upper" and "lower" are usually defined based on a direction of gravitational force.

Figure 1B:
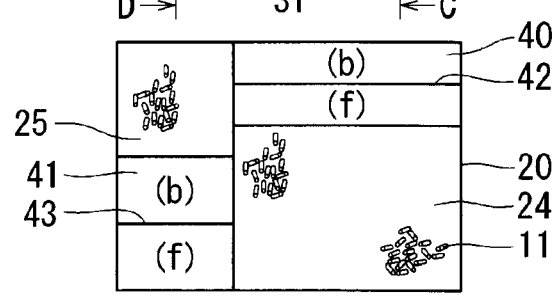
FIGS. 1B-D are schematic cross sectional views taken along with B-B, C-C and D-D lines in FIG. 1A, respectively.
Figure 1C:
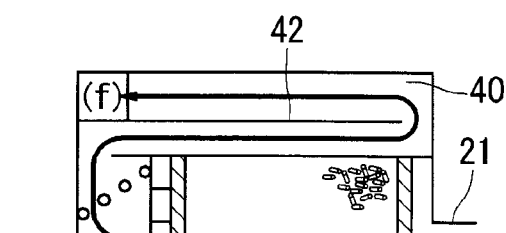
Figure 1D:
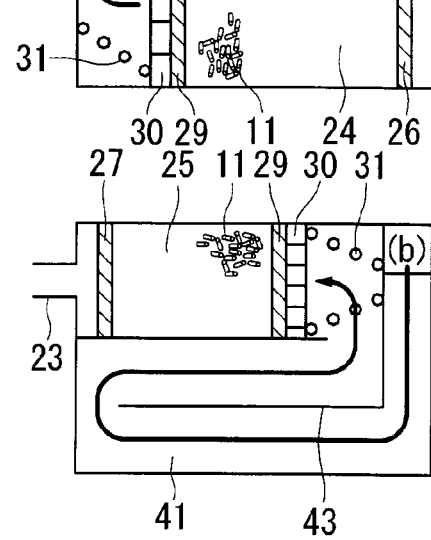
Figure 2A:
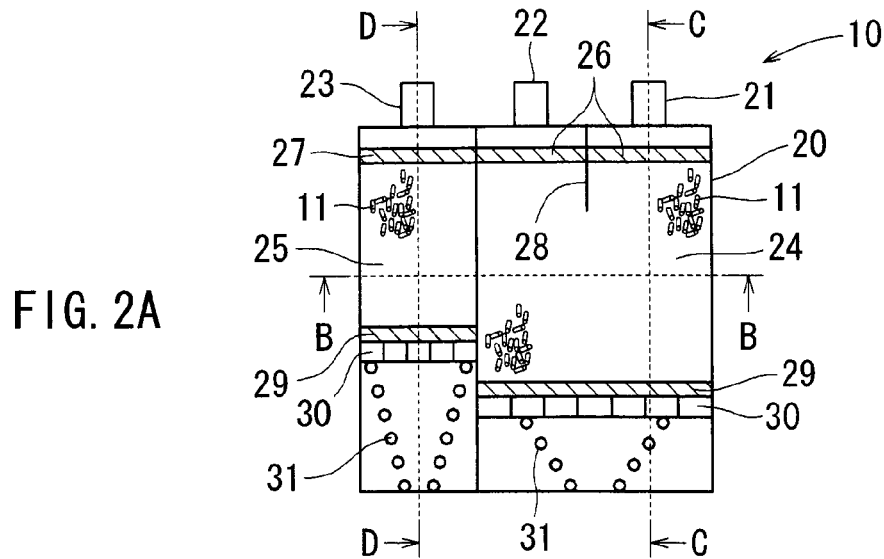
FIG. 2A is a schematic horizontal cross sectional view of a second embodiment of the adsorbent canister.
Figure 2B:
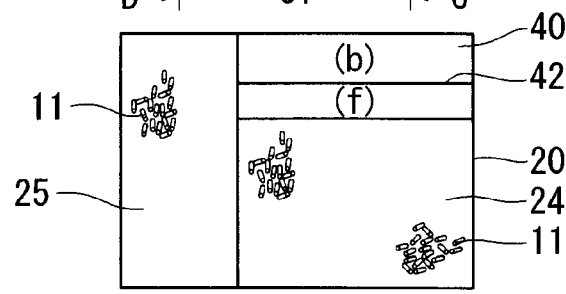
FIGS. 2B-D are schematic cross sectional views taken along with B-B, C-C and D-D lines in FIG. 2A, respectively.
Figure 2C:
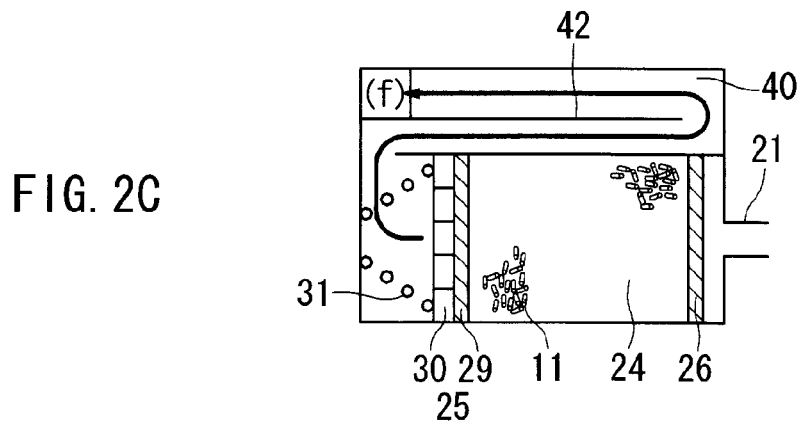
Figure 2D:
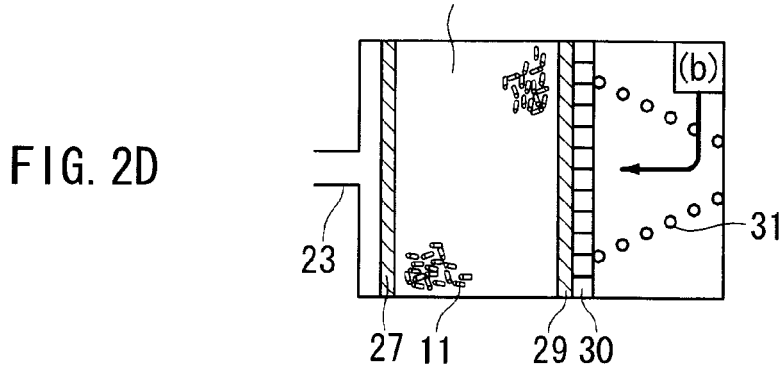

Firstly, a canister 10 will be described with reference to FIGS. 1A-D. FIG. 1A shows the schematic horizontal cross sectional view of the canister 10, and FIGS. 1B-D show the schematic cross sectional views taken along with the B-B, C-C and D-D lines in FIG. 1A, respectively. The canister 10 is configured to temporarily trap fuel vapor (gasoline vapor) vaporized in a fuel tank (not shown). The canister 10 has a casing 20 to be filled with an adsorbent 11.

The casing 20 is made of a thermoplastic resin or the like and in a hollow box shape and having on a side wall thereof three ports each communicating an inner space of the casing 20 with outside thereof. Each of the ports is provided with a cylindrical wall for connected with a pipe. One of the ports is a fuel introducing port 21 communicating with the fuel tank via a pipe. The fuel introducing port 21 is configured to introduce the fuel vapor from the fuel tank into the canister 10. Another one of the ports is an exhaust port 22 communicating with a purge source such as air intake pipe of an engine via a pipe. The exhaust port 22 is configured to discharge the fuel vapor from the canister 10 and is disposed parallel to the fuel introducing port 21 on the same side wall of the casing 20. The other of the ports is an air communicating port 23 communicating with an ambient air inlet via a hose. The air communicating port 23 is configured to release gas toward the atmosphere and introduce the ambient air into the canister 10.

The casing 20 defines a first adsorption chamber 24 and a second adsorption chamber 25 therein. The first adsorption chamber 24 communicates with the fuel introducing port 21 and the exhaust port 22 via a filter 26. Whereas, the second adsorption chamber 25 communicates with the air communicating port 23 via a filter 27. Each of the filters 26 and 27 are made of nonwoven cloth or the like.

The casing 20 has a partition 28 extending from an inner surface of the casing 20 toward a center region of the first adsorption chamber 24 such that the partition 28 divides a part of the first adsorption chamber 24 into two areas each communicating with the fuel introducing port 21 or the exhaust port 23. The partition 28 is integrated with the casing 20.

The first and second adsorption chambers 24 and 25 are filled with the adsorbent 11 capable of removably adsorbing the fuel vapor. The adsorbent 11 filled in the first and the second adsorption chambers 24 and 25 may be composed of granule-shaped activated carbon capable of trapping the fuel vapor, in particular, granular activated carbon, extruded activated carbon or the like. The adsorbent 11 may be mixed with heat storage material. The heat storage material may be composed of various materials such as phase-change materials absorbing and releasing heat depending on ambient temperature. For example, the heat storage material is composed of granules made from mixture of a suitable binder and microcapsules containing phase-change materials therein. Here, the filters 26 and 27 disposed in the first adsorption chamber 24 and the second adsorption chamber 25, respectively, have pores smaller than a diameter of the adsorbent 11 in order to keep the adsorbent 11 in the first and second adsorption chamber 24 and 25.

A filter 29 and an inner lid 30 are disposed in the casing 20 such that the filter 29 and the inner lid 30 are positioned at another side of the first adsorption chamber 24 opposite to the fuel introducing port 21. Another set of the filter 29 and the inner lid 30 is disposed at the second adsorption chamber 25 and has the substantially same configuration as that disposed in the first adsorption chamber 24. Thus, the filter 29 and the inner lid 30 at the first adsorption chamber 24 will be described and another set at the second adsorption chamber 25 will not be described.

The inner lid 30 is composed of a porous plate having a ventilation characteristic and is configured to keep the adsorbent 11 in the first adsorption chamber 24 together with the filter 29. The inner lid 30 can slide along inner surfaces of the casing 20 in a horizontal direction while closing one side of the first adsorption chamber 24. The inner lid 30 has a back surface not contacting with the filter 29 (i.e., the lower surface of the inner lid 30 in FIG. 1A) and connected with an end of a coil spring 31. Another end of the coil spring 31 is supported by the casing 20 such that the coil spring 31 biases the inner lid 30 and the filter 29 toward the center region of the first adsorption chamber 24 (i.e., upwardly in FIG. 1A). Accordingly, it is able to eliminate unnecessary empty spaces between the granules of the adsorbent 11 in order to airflow resistance in the first adsorption chamber 24.

As shown in FIGS. 1B-D, the casing 20 defines a first diffusion chamber 40 and a second diffusion chamber 41 therein. The first diffusion chamber 40 is positioned above the first adsorption chamber 24 in the direction of gravitational force and extends over the entire length of the first adsorption chamber 24 in a horizontal direction, i.e., a flowing direction of the fuel vapor in the first adsorption chamber 24. The second diffusion chamber 41 is positioned below the second adsorption chamber 25 in the direction of gravitational force and extends over the entire length of the second adsorption chamber 25 in the horizontal direction, i.e., a flowing direction of the fuel vapor in the second adsorption chamber 25. A partition plate 42 extending in the horizontal direction is provided in the first diffusion chamber 40 such that the first diffusion chamber 40 is divided into two layers parallel to each other. The parallel layers of the first diffusion chamber 40 communicate with each other and form a substantially U-shape pathway (shown by an arrow in FIG. 1C) in the first diffusion chamber 40. Similarly, the second diffusion chamber 41 is divided into two layers by a partition plate 43 such that the two layers form a substantially U-shaped pathway as shown in FIG. 1D. The first adsorption chamber 40 communicates with the lower layer of the first diffusion chamber 40 via the filter 29 and the inner lid 30. The upper layer of the first diffusion chamber 40 communicates with the lower layer of the second diffusion chamber 41. And, the upper layer of the second diffusion chamber 41 communicates with the second adsorption chamber 25 via the filter 29 and the inner lid 30. That is, gas introduced into the first adsorption chamber 24 sequentially flows through the lower layer and the upper layer of the first diffusion chamber 40, the lower layer and the upper layer of the second diffusion chamber 41, and the second adsorption chamber 25, and then flows out of the canister 10 through the air communicating port 23. The volumes of the first diffusion chamber 40 and the second diffusion chamber 41 can be changed depending on the volume of the adsorbent 11 filled in the first adsorption chamber 24 and the second adsorption chamber 25, or the volume of the casing 20, etc.

When introducing fuel vapor containing gas into the casing 20 through the fuel introducing port 21, while the gas sequentially flows through the first adsorption chamber 24, the first diffusion chamber 40, the second diffusion chamber 41 and the second adsorption chamber 25, most of the fuel vapor in the gas adsorbs onto the adsorbent 11 filled in the first adsorption chamber 24, and remaining fuel vapor are trapped by the adsorbent 11 in the second adsorption chamber 25. And then, the gas substantially not containing the fuel vapor is discharged through the air communicating port 23. Here, the partition 28 prevents the gas introduced into the first adsorption chamber 24 through the fuel introducing port 21 from flowing out of the canister 10 through the exhaust port 22. On the other hand, when introducing ambient air into the casing 20 through the air communicating port 23, while the air sequentially flows through the second adsorption chamber 25, the second diffusion chamber 41, the first diffusion chamber 40 and the first adsorption chamber 24, the fuel vapor is removed from the adsorbent 11 filled in the first adsorption chamber 24 and the second adsorption chamber 25. And then, the air is discharged through the exhaust port 22 together with the fuel vapor. The canister 10 is mounted on a vehicle under a floor thereof such that when the fuel vapor flows in the canister from the fuel introducing port 21 to the air communicating port 23, the fuel vapor flows in a substantial horizontal direction in the first adsorption chamber 24 and the second adsorption chamber 25.

A part of the fuel vapor adsorbing onto the adsorbent 11 in the first adsorption chamber 24 desorbs from the adsorbent 11 and diffuses to the second adsorption chamber 25 through the first diffusion chamber 40 and the second diffusion chamber 41 during parking. Here, because the fuel vapor has specific gravity higher than air, it is difficult for the fuel vapor to move upwardly in the direction of gravitational force by diffusive movement. Accordingly, it is able to reduce the amount of the fuel vapor flowing from the first adsorption chamber 24 to the second diffusion chamber 41 by providing the first diffusion chamber 40 above the first adsorption chamber 24 in the direction of gravitational force. As shown in FIG. 1D, the fuel vapor flowing into the second diffusion chamber 41 moves to the lower layer of the second diffusion chamber 41 due to own weight thereof, and then diffuses toward the second adsorption chamber 25. Because the second adsorption chamber 25 is disposed above the second diffusion chamber 41, the fuel vapor has to move upwardly against the own weight in order to reach the second adsorption chamber 25 from the second diffusion chamber 41. Accordingly, it is able to reduce the amount of the fuel vapor diffusing to the second adsorption chamber 25 due to such configuration.

In addition, because the partition plates 42 and 43 are disposed in the first diffusion chamber 40 and the second diffusion chamber 41, respectively, a pathway between the first adsorption chamber 24 and the second adsorption chamber 25 is lengthened compared with another canister without the partition plates 42 and 43. Accordingly, diffusive movement of the fuel vapor from the first adsorption chamber 24 to the second adsorption chamber 25 requires a longer period of time, so it is able to reduce the amount of the fuel vapor reaching the second adsorption chamber 25 within a certain period of time, i.e. parking duration.

When the engine is started, ambient air is introduced into the casing 20 through the air communicating port 23 due to purge operation, so that the fuel vapor in the first diffusion chamber 40 and the second diffusion chamber 41 flows into the first adsorption chamber 24 together with the air. Then, a part of the fuel vapor is temporarily trapped by the adsorbent 11 in the first adsorption chamber 24 and the rest of the fuel vapor is flowed toward a purge source through the exhaust port 22.

As the pathway of the first diffusion chamber 40 and the second diffusion chamber 41 is lengthened, retarding effect for the diffusion of the fuel vapor becomes higher. However, airflow resistance is increased by a turning structure for making the pathway longer, for example, a connection between the lower layer and the upper layer of the first diffusion chamber 40 as shown in FIG. 1C. When many turning structures are provided to the casing 20, the airflow resistance in the first diffusion chamber 40 and the second diffusion chamber 41 becomes much higher. Accordingly, in such case, it is difficult to introduce the fuel vapor into the casing 20, and the amount of the ambient air flowing into the casing 20 during purge operation decreases, so that purge efficiency also decreases. On the other hand, when the first diffusion chamber 40 and the second diffusion chamber 41 have large volumes, it is able to decrease the amount of the fuel vapor diffusively flowing from the first adsorption chamber 24 to the second adsorption chamber 25 in a certain period of time without increase in the airflow resistance. Thus, it is able to effectively improve the canister 10 by increasing the total volume of the diffusion chambers 40 and 41 between the first adsorption chamber 24 and the second adsorption chamber 25 than by lengthening the total length of the pathway in the diffusion chambers 40 and 41.

When the fuel vapor adsorbs onto the adsorbent 11 in the first adsorption chamber 24, because the temperature of the adsorbent 11 increases due to heat of condensation, adsorption ability of the adsorbent 11 for the fuel vapor decreases. A conventional canister not having the first diffusion chamber 40 and the second diffusion chamber 41 usually has a larger area where a first adsorption chamber and a second adsorption chamber are positioned adjacent to each other, so that heat generating in the first adsorption chamber is easily transferred to the adsorbent in the second adsorption chamber via the casing. Accordingly, there has been a problem that because the temperature of the adsorbent in the second adsorption chamber increases due to heat transfer from the first adsorption chamber, an adsorption ability of the adsorbent in the second adsorption chamber decreases before adsorbing the fuel vapor. However, the canister 10 of this embodiment has the first diffusion chamber 40 and the second diffusion chamber 41, so that the area where the first adsorption chamber 24 and the second adsorption chamber 25 are adjacent to each other is decreased compared with the conventional canister. Accordingly, it is able to decrease heat transfer between the first adsorption chamber 24 and the second adsorption chamber 25, so that it is able to prevent decrease in the adsorption efficiency of the adsorbent 11 filled in the second adsorption chamber 25 before adsorption of the fuel vapor.

In a second embodiment, as shown in FIGS. 2A-D, the casing 20 defines the first diffusion chamber 40 above the first adsorption chamber 24 in the direction of gravitational force and does not have the second diffusion chamber 41. Accordingly, the first diffusion chamber 40 can decrease the amount of the fuel vapor diffusively flowing into the second adsorption chamber 25 from the first adsorption chamber 24 in a certain period of time. Here, other configurations of the second embodiment are same as those of the first embodiment, so that corresponding components are labeled with the same reference numbers, respectively, and will not be described.

In a third embodiment, as shown in FIGS. 3A-D, the casing 20 defines the second diffusion chamber 41 below the second adsorption chamber 25 in the direction of gravitational force and does not have the first diffusion chamber 40. Accordingly, the second diffusion chamber 41 can decrease the amount of the fuel vapor diffusively flowing into the second adsorption chamber 25 from the first adsorption chamber 24 in a certain period of time. Here, other configurations of the third embodiment are same as those of the first embodiment, so that corresponding components are labeled with the same reference numbers, respectively, and will not be described.

Although the first diffusion chamber 40 and the second diffusion chamber 41 is divided into two layers, respectively, in the above described embodiments, each of the first and second diffusion chambers 40 and 41 can be divided into at least three layers by disposing a plurality of partition plates therein. In addition, the partition plates 42 and 43 are disposed in the diffusion chambers 40 and 41 such that the partition plates 42 and 43 extend parallel to a bottom wall of the casing 20, however, the partition plates 42 and 43 can be disposed vertical to the bottom wall of the casing 20, i.e., parallel to the direction of gravitational force.

This invention claims:

1. An adsorbent canister comprising:
a casing defining a first adsorption chamber, a second adsorption chamber, and a diffusion chamber therein, and having on a side wall thereof, a fuel introducing port configured to introduce fuel vapor into the first adsorption chamber and an air communicating port configured to introduce air into the second adsorption chamber, the first adsorption chamber and the second adsorption chamber communicating with each other via the diffusion chamber and each extending in a horizontal direction to allow fuel vapor to flow therein in the horizontal direction, the horizontal direction being perpendicular to a direction of gravitational force, the diffusion chamber having at least one of a first diffusion chamber and a second diffusion chamber configured to allow fuel vapor to flow therein in the horizontal direction, the first diffusion chamber positioned on the first adsorption chamber and extending in the horizontal direction over the entire length of the first adsorption chamber, the second diffusion chamber positioned under the second adsorption chamber and extending in the horizontal direction over the entire length of the second adsorption chamber; and
an adsorbent capable of adsorbing the fuel vapor and filled in the first adsorption chamber and the second adsorption chamber, wherein:
the first adsorption chamber has a first width in a direction perpendicular to a flow direction of the fuel vapor through the first adsorption chamber;
the first diffusion chamber has a second width in a direction perpendicular to a flow direction of the fuel vapor through the first diffusion chamber;
the second adsorption chamber has a third width in a direction perpendicular to a flow direction of the fuel vapor through the second adsorption chamber;
the second diffusion chamber has a fourth width in a direction perpendicular to a flow direction of the fuel vapor through the second diffusion chamber;
the second width is the same as the first width; and
the fourth width is the same as the third width.

2. The adsorbent canister according to claim 1, wherein the casing has at least one partition plate dividing at least one of the first diffusion chamber and the second diffusion chamber into a plurality of spaces communicating with each other.

3. The adsorbent canister according to claim 2, wherein the casing is formed in a substantial box shape with a bottom wall, and the partition plate is positioned parallel to the bottom wall of the casing.

4. The adsorbent canister according to claim 1, wherein:
the adsorbent canister includes both of the first diffusion chamber and the second diffusion chamber, and
the second diffusion chamber is located on a downstream side of the first diffusion chamber.

5. The adsorbent canister according to claim 4, wherein the flow directions of the fuel vapor though the first adsorption chamber, the first diffusion chamber, the second adsorption chamber and the second diffusion chamber are parallel to each other.

* * * * *